United States Patent [19]

Rayner et al.

[11] Patent Number: 4,988,982
[45] Date of Patent: Jan. 29, 1991

[54] TOUCH PAD MACHINE CONTROL

[75] Inventors: Bruce L. Rayner, Nevada City; Peter N. Johnson, Grass Valley, both of Calif.

[73] Assignee: The Grass Valley Group, Inc., Nevada City, Calif.

[21] Appl. No.: 333,888

[22] Filed: Apr. 3, 1989

Related U.S. Application Data

[63] Continuation of Ser. No. 30,778, Mar. 25, 1987, abandoned.

[51] Int. Cl.$^5$ .............................................. G09G 5/00
[52] U.S. Cl. .................................. 340/706; 340/712; 341/22
[58] Field of Search ...................... 340/706, 711, 712; 341/31, 32, 33, 34, 22; 178/18, 19, 20

[56] References Cited

U.S. PATENT DOCUMENTS

| | | | |
|---|---|---|---|
| 4,186,392 | 1/1980 | Holz | 340/365 C |
| 4,221,975 | 9/1980 | Ledniczcki et al. | 340/365 C |
| 4,334,219 | 6/1982 | Paulus et al. | 340/712 |
| 4,412,209 | 10/1983 | Frame et al. | 340/365 C |
| 4,413,314 | 11/1983 | Slater et al. | 340/712 |
| 4,514,817 | 4/1985 | Pepper et al. | 340/365 C |
| 4,631,525 | 12/1986 | Serravalle, Jr. | 340/712 |

OTHER PUBLICATIONS

*One Point Touch Input of Vector Information for Computer Displays;* Herot; Computer Graphics, vol. 12, No. 3, 8/78; reprinted in IEEE Cat. No. EH0147-9, pp. 275–281.

*Primary Examiner*—Alvin E. Oberley
*Assistant Examiner*—Richard Hjerpe
*Attorney, Agent, or Firm*—Francis I. Gray; John Smith-Hill

[57] ABSTRACT

A touch pad machine control system uses a touch pad having an overlay to define control strip surface areas which perform different functions. The contact of an operator's finger along one of the defined control strips selects a desired function and produces the desired machine motion from the rate, distance or duration of finger contact according to the desired function. The result is equivalent control motion without the need for moving parts.

14 Claims, 2 Drawing Sheets

TOUCH PAD MACHINE CONTROL

This is a continuation of application of Ser. No. 030,778 filed Mar. 25, 1987 and now abandoned.

BACKGROUND OF THE INVENTION

The present invention relates to machine control, and more particularly to a touch pad machine control which remotely provides the feel of hands on control of a machine.

In many applications it is necessary to control a machine from a remote location. Such control is exercised via push buttons and rotary knobs. For example in a video tape editing suite a video tape recorder (VTR) may be positioned by running it forward or backward at different speeds to locate a particular video frame. This positioning is done while viewing a video monitor to determine when the particular frame is located under the read head of the VTR. Manually the positioning could be done by spinning the tape reels by hand, initially at a high rate of speed until close to the desired video frame, and then at a slower speed as the video frame is approached. It may be necessary to make slight adjustments back and forth, "jogging", to position the VTR exactly at the desired video frame.

This positioning of the VTR may also be done remotely using corresponding push buttons and a rotary knob. Movement of the rotary knob simulates the manual rotation of the reels of the VTR. The use of the rotary knob to locate and position a desired video frame on a video tape under the read head of a VTR requires manual dexterity of a higher order than the manual manipulation of tape reels. Also the rotary knob has to perform different functions which requires push buttons to select the desired knob function. The result is a certain amount of unnatural feel to the positioning of the video tape.

Touch pads of various sorts have been implemented in many applications for controlling cursors on a computer terminal, selecting functions, line drawing and the like. Such use of touch pads is illustrated by the KB 5153 Touch Pad Keyboard manufactured by Key Tronic of Spokane, Wash.

What is desired is a means to control a machine using a touch pad to provide to the operator a natural, hands on feeling of motion.

SUMMARY OF THE INVENTION

Accordingly the present invention provides a touch pad machine control which allows an operator to control a machine by the movement of a finger across the surface of a touch pad. A touch pad has an overlay that defines the surface as a plurality of control strips representing different functions. The x-y coordinates of the touch pad in response to the contact of an operator's finger are sampled at a predetermined rate and are input to an interface which converts the x-y coordinate information into control commands for the machine being controlled. Rate information may be derived from the speed of the finger across the control strip by determining the distance traveled by the finger in one direction within a sampled period of time. Stationary tapping of the finger may be used to provide incremental motion in one direction or the other depending on the relationship of the finger with respect to the center of the control strip. Motion of the machine may be maintained when the finger breaks contact with the control strip, and may be stopped when the finger is held stationary on the control strip.

The objects, advantages and novel features of the present invention will be apparent from the following detailed description when read in conjunction with the appended claims and attached drawing.

DESCRIPTION OF THE PREFERRED EMBODIMENT

Figure 1:
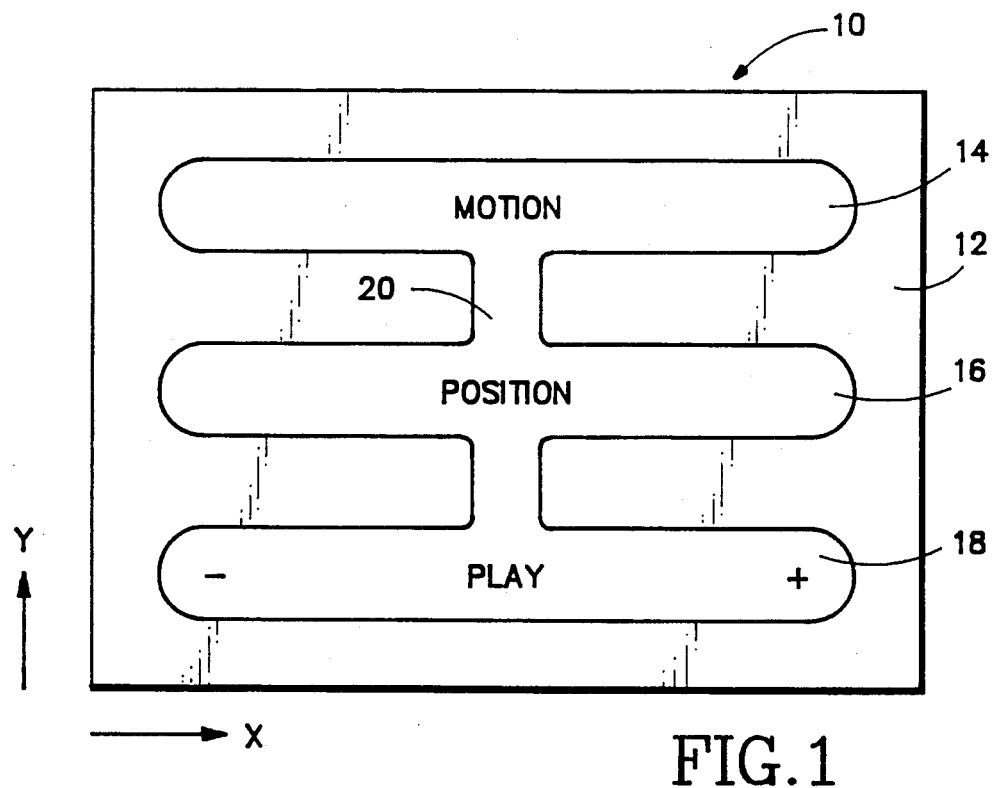
FIG. 1 is a plan view of a touch pad configured according to the present invention.

Referring now to FIG. 1 a touch pad 10 is shown configured by an overlay 12 for controlling the motion of a machine, such as the video tape motion and position of a video tape recorder (VTR) in a video editing suite. The overlay 12 divides the surface of the touch pad 10 into a plurality of control strips 14-18 which may be connected at the respective midpoints by an orthogonal center strip 20. For a video editing suite these control strips 14-18 may have the following functions: motion or variable-shuttle mode, position or jog mode, and play/bump mode. The motion function provides for setting the speed of the video tape of the VTR. The position function provides for locating a specific frame on the video tape. The play function provides for moving the VTR tape either forward (+) or backward (−) at normal play speed.

Figure 2:
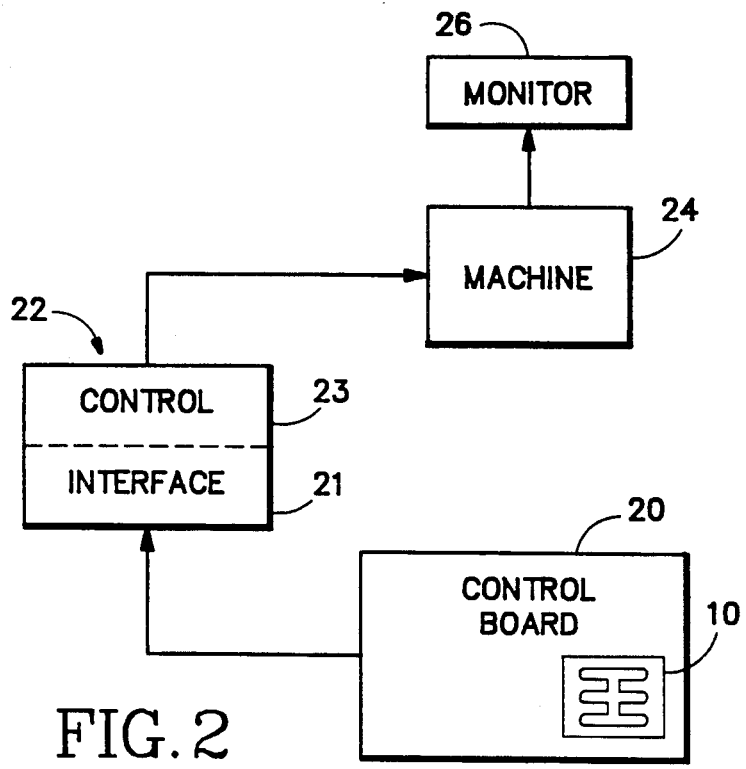
FIG. 2 is a block diagram of a machine system suitable for using the touch pad machine control of the present invention.

As shown in FIG. 2 a control board 20 having the touch pad 10 is connected to a data processor 22 having an interface portion 21 and a control portion 23. The contact of the finger with the surface of the touch pad 10 is converted into a two-axis coordinate value, such as orthogonal x-y data pairs, by the control board 20. The x-y contact value is sampled at a rate to assure sufficient data points to make motion rate determinations to a desired accuracy. The x-y data points are transmitted to the interface section 21 for determination of desired machine functions to be executed. The desired machine functions are then converted by the control section 23 into commands which are transmitted to the machine 24 being controlled. The results of the machine reaction to the touch pad input are displayed on a suitable monitor 26. The interface section 21 interprets the y values of the finger position by comparing these values with a table of y values to determine which function algorithm is to be processed. The x values for consecutive samples are subtracted from each other to obtain increment values which are used to access a speed algorithm or appropriate table to determine the desired speed of movement of the machine according to the selected function algorithm The speed algorithm or table may produce values such that for small or slow movement of the finger the resulting speed adjustment is fine, while for large or fast movement of the finger the resulting speed adjustment is coarse. Further where no motion of the finger contact is detected, then the finger contact may be interpreted as a specified incremental motion, as an incremental motion rate change, or as a decelerate or stop command.

Figure 3:
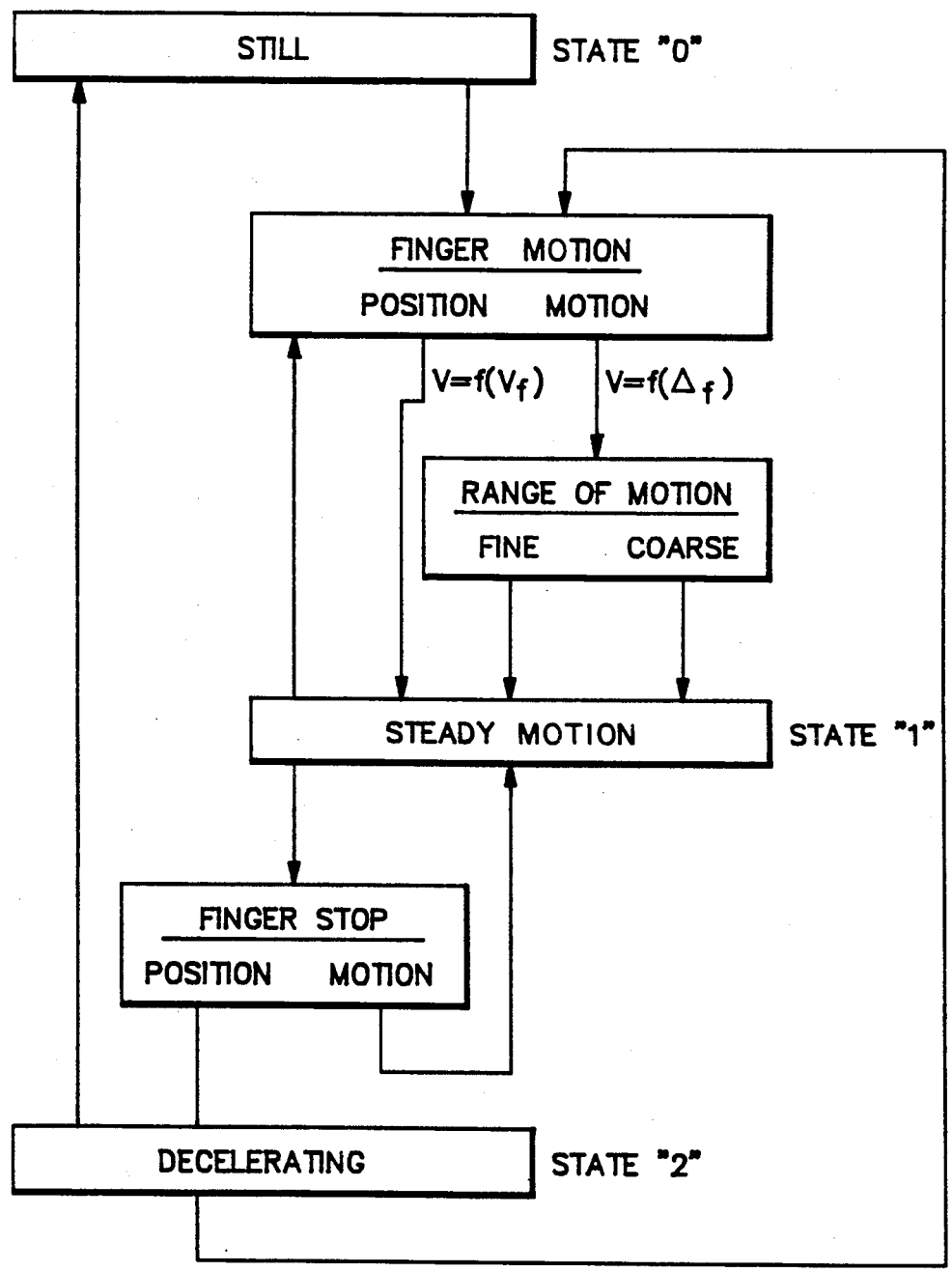
FIG. 3 is a state transition diagram for operation of the touch pad of FIG. 1 as a machine control according to the present invention.

The operation of the touch pad machine control for a video editing suite is described with reference to FIG. 3. Initially the video tape is in a still, or zero, state. Detected finger movement is interpreted as either a motion function or a position function according to the value of the y coordinate. For motion control the speed of the video tape drive is a function of the amount of change of finger position along the motion control strip 14. The amount of speed variation as a function of finger position change depends upon the percentage of the length of the motion control strip 14 along which the finger moves. For small finger position changes the speed is adjusted at a fine rate, while for large finger position changes the speed is adjusted at a coarse rate. When the finger breaks contact with the touch pad surface the video tape drive is in a steady motion, or one, state. Additional finger movements along the motion control strip 14 either increase or decrease the speed of the video tape drive depending upon the direction of the finger movement. When the tape drive reaches the maximum variable rate for the VTR, further attempts to increase the tape drive speed are ignored. When the finger is stationary on the motion control strip 14, the tape drive speed stays in the steady motion state.

If the finger movement is along the position control strip 16, the speed of movement of the tape drive is a function of the rate of finger movement along the control strip. This gives the same feel as manually spinning up a bicycle tire. Additional finger movements at a faster rate along the position control strip 16 result in increasing the speed of the tape drive. When the finger is stopped on the position control strip 16, a deceleration algorithm is accessed to slow and stop the tape drive in a controlled manner, returning the tape drive to the still state. Releasing the finger from the surface of the touch pad 10, if the finger motion is stopped first, results in a complete stop, while releasing the finger during finger motion across the touch pad leaves the tape drive moving at the last commanded rate. Finger movement along either the motion or position control strips 14, 16 while decelerating overrides the deceleration algorithm and provides speed adjustment as described above.

Although the embodiment described uses an x-y coordinate system, any two-axis coordinate system including polar coordinate systems could be used. Further any mechanical motion can be simulated by the use of touch pad control, eliminating the need for any moving parts. Push buttons can be simulated by finger tapping on the touch pad, linear motion can be simulated directly by similar motion along the touch pad, and rotary motion can be simulated as described above.

Thus the present invention provides touch pad machine control by simulating apparent motion without the use of moving parts by converting finger movement along the surface of a touch pad into motion commands according to the portion of the touch pad contacted.

What is claimed is:

1. A method of controlling a device with a touch pad comprising the steps of:
   converting the movement of a pointer over a first region of the surface of the touch pad into a plurality of data points;
   determining from the data points data parameters, the data parameters including the rate of movement of the pointer along an axis and release of the pointer; and
   generating a velocity control signal for the device as a function of the data parameters to vary the movement of the device wherein the rate of movement of the pointer in contact with the touch pad corresponds directly to the velocity of the device being controlled, release of the pointer from contact results in control of the device at a constant velocity defined as the last previous velocity of the device prior to release of the pointer from the touch pad, and zero velocity of the pointer in contact with the touch pad corresponds to deceleration of the device to be controlled.

2. The method as recited in claim 1 wherein the step of generating the velocity control signal comprises the step of limiting the velocity control signal to a specified maximum velocity.

3. A method as recited in claim 1 wherein the surface of the touch pad has a second region and the method comprises initially determining from the data points a selected control function based on whether the pointer is touching the first mentioned region or the second region and then determining data parameters from the data points in a manner that depends on the selected control function.

4. A method as recited in claim 3 wherein, in the event that the pointer is touching the second region, the method comprises determining the direction and distance moved by the pointer and generating a second velocity control signal indicative of the direction and distance moved by the pointer.

5. A method as recited in claim 4 wherein the step of generating the second velocity control signal comprises the step of interpreting small distance movements as fine velocity adjustments and interpreting large distance movements as coarse velocity adjustments.

6. A method as recited in claim 4 wherein the surface of the touch pad has a third region comprising first, second, and third sub-regions, and in the event that the pointer is touching the third region the method comprises generating a start-forward command if the pointer is within the first sub-region, generating a stop command if the pointer is within the second sub-region, and generating a start-reverse command if the pointer is within the third sub-region.

7. A method as recited in claim 1 wherein the surface of the touch pad has a second region comprising first, second, and third sub-regions, and in the event that the pointer is touching the second region the method comprises generating a start-forward command if the pointer is within the first sub-region, generating a stop command if the pointer is within the second sub-region, and generating a start-reverse command if the pointer is within the third sub-region.

8. An apparatus for controlling a device with a touch pad comprising:
   means for converting the movement of a pointer along a first region of the surface of the touch pad into a plurality of data points;
   means for determining from the data points data parameters, the data parameters including a rate of movement of the pointer over an axis and a release of the pointer; and
   means for generating a movement control signal for the device as a function of the data parameters to vary the movement of the device wherein the rate of movement of the pointer in contact with the touch pad corresponds directly to the velocity of the device being controlled, release of the pointer from contact results in control of the device at a constant velocity defined as the last previous velocity of the device prior to release of the pointer from the touch pad, and zero velocity of the pointer in contact with the touch pad corresponds to deceleration of the device to be controlled.

9. An apparatus as recited in claim 8 wherein the means for generating the velocity control signal comprises means for limiting the velocity control signal to a specified maximum velocity.

10. An apparatus as recited in claim 8 wherein the surface of the touch pad has a second region and the determining means further comprises means for initially determining from the data points a selected control function based on whether the pointer is touching the first mentioned region or the second region and means for then determining data parameters from the data points in a manner that depends on the selected control function.

11. An apparatus as recited in claim 10 wherein the apparatus comprises means for determining the direction and distance moved by the pointer over the second region and means for generating a second velocity control signal indicative of the direction and distance moved by the pointer.

12. An apparatus as recited in claim 11 wherein the means for generating the second velocity control signal comprises means for interpreting small distance movements as fine velocity adjustments and interpreting large distance movements as coarse velocity adjustments.

13. An apparatus as recited in claim 10 wherein the surface of the touch pad has a third region comprising first, second, and third sub-regions, and the apparatus comprises means for generating a start-forward command if the pointer is touching the third region within the first sub-region, means for generating a stop command if the pointer is touching the third region within the second sub-region, and means for generating a start-reverse command if the pointer is touching the third region within the third sub-region.

14. An apparatus as recited in claim 8 wherein the surface of the touch pad has a second region comprising first, second, and third sub-regions, and the apparatus comprises means for generating a start-forward command if the pointer is touching the second region within the first sub-region, means for generating a stop command if the pointer is touching the second region within the second sub-region, and means for generating a start-reverse command if the pointer is touching the second region within the third sub-region.

* * * * *